3,159,644
3 - HALO(OR NITRO) - PHENYLALKYLMERCAPTO-
5 - HALO(OR NITRO) - 1,2,4 - THIADIAZOLE
John A. Stephens, Dayton, Ohio, assignor to Monsanto
Company, a corporation of Delaware
No Drawing. Filed Apr. 11, 1960, Ser. No. 21,145
3 Claims. (Cl. 260—302)

This invention relates to new organic compounds, to biological compositions containing them, and to methods for their application.

The new compounds may be described generally as thiadiazoles and are more precisely defined by the general Formula Number I set forth below:

(I) 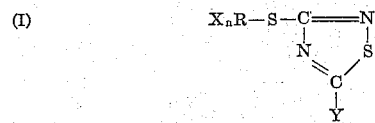

wherein Y is from the group consisting of halo and nitro radicals, R is a radical from the group consisting of (1) straight and branched chain alkenyl and alkynyl radicals of from two to eight carbon atoms wherein X is from the group consisting of hydrogen, halo and nitro radicals, and $n$ is an integer of from one to five where X is a halogen and $n$ is not greater than 2 where X is the nitro radical, and (2) phenylalkyl radicals, the alkyl portion thereof having from one to four alkyl carbon atoms, wherein X is a radical from the group consisting of alkyl, alkoxy, halo and nitro radicals, and $n$ is an integer of from one to five when X is a halogen and $n$ is from one to two where X is nitro, and where X is alkyl or alkoxy, $n$ is an integer limiting the total number of carbon atoms therein to four.

The above general formula is inclusive of more particular general formulae which are employed herein to characterize specific groups of the new compounds of the invention. These additional general formulae are as follows:

(II) 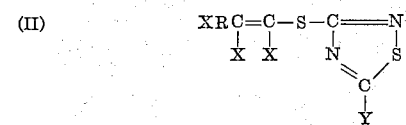

(III) 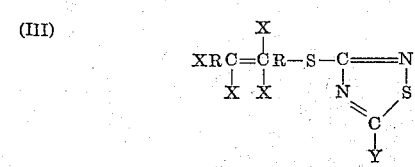

(IV) 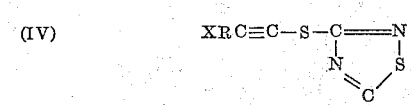

(V) 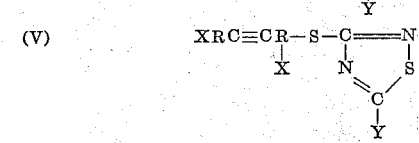

In the foregoing four specific formulae R's are chosen from the group of radicals consisting of hydrogen and hydrocarbon radicals, the total number of carbon atoms thereby introduced into the indicated chains not exceeding six, and X and Y are as heretofore defined in the principal general formula, particularly part (1) thereof.

An additional general formula setting out the new compounds of the invention similarly more specifically is as follows:

(VI) 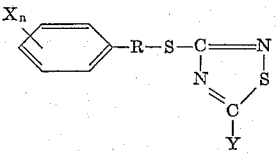

wherein R is a hydrocarbon radical of from one to four carbon atoms and X, $n$ and Y are as heretofore defined in general Formula Number I, particularly part (2) thereof.

Specific examples of new compounds falling within the foregoing general formulae are the following:

3-allylmercapto-5-chloro-1,2,4-thiadiazole
3-(2-chloroallylmercapto)-5-chloro-1,2,4-thiadiazole
3-(2-nitroallylmercapto)-5-chloro-1,2,4-thiadiazole
3-(2-methylallylmercapto)-5-chloro-1,2,4-thiadiazole
3-(2-chloromethylallylmercapto)-5-chloro-1,2,4-thiadiazole
3-(vinylmercapto)-5-chloro-1,2,4-thiadiazole
3-(2-chlorovinylmercapto)-5-chloro-1,2,4-thiadiazole
3-(1-butenylmercapto)-5-chloro-1,2,4-thiadiazole
3-(2-butenylmercapto)-5-chloro-1,2,4-thiadiazole
3-(3-butenylmercapto)-5-chloro-1,2,4-thiadiazole
3-(4-chloro-2-butenylmercapto)-5-chloro-1,2,4-thiadiazole
3-(4-nitro-2-butenylmercapto)-5-chloro-1,2,4-thiadiazole
3-(3-methyl-2-hexenylmercapto)-5-chloro-1,2,4-thiadiazole
3-(5-chloro-3-methyl-2-hexenylmercapto)-5-chloro-1,2,4-thiadiazole
3-(1-pentenylmercapto)-5-chloro-1,2,4-thiadiazole
3-(2-pentenylmercapto)-5-chloro-1,2,4-thiadiazole
3-(5-chloro-2-pentenylmercapto)-5-chloro-1,2,4-thiadiazole
3-(4-nitro-2-pentenylmercapto)-5-chloro-1,2,4-thiadiazole
3-(2-hexenylmercapto)-5-chloro-1,2,4-thiadiazole
3-(8-chloro-2-octenylmercapto)-5-chloro-1,2,4-thiadiazole
3-propargylmercapto-5-chloro-1,2,4-thiadiazole
3-ethynylmercapto-5-chloro-1,2,4-thiadiazole
3-(2-butynylmercapto)-5-chloro-1,2,4-thiadiazole
3-(4-chloro-2-butynylmercapto)-5-chloro-1,2,4-thiadiazole
3-(1,4-dichloro-2-butynylmercapto)-5-chloro-1,2,4-thiadiazole
3-(1,4-dinitro-2-butynylmercapto)-5-chloro-1,2,4-thiadiazole
3-(3-butynylmercapto)-5-chloro-1,2,4-thiadiazole
3-(4-pentynylmercapto)-5-chloro-1,2,4-thiadiazole
3-(5-chloro-2-pentynylmercapto)-5-chloro-1,2,4-thiadiazole
3-(1,5-dinitro-2-pentynylmercapto)-5-chloro-1,2,4-thiadiazole
3-(2-hexynylmercapto)-5-chloro-1,2,4-thiadiazole
3-(6-chloro-2-hexynylmercapto)-5-chloro-1,2,4-thiadiazole
3-(2-ethyl-2-hexynylmercapto)-5-chloro-1,2,4-thiadiazole
3-[2-(chloromethyl)-3-hexynylmercapto]-5-chloro-1,2,4-thiadiazole
3-(8-chloro-2-octynylmercapto)-5-chloro-1,2,4-thiadiazole
3-(8-nitro-2-octynylmercapto)-5-chloro-1,2,4-thiadiazole Additional exemplary compounds are provided by replacing the "chloro" of the expression "-5-chloro-" in the above-named compounds by one of the radicals bromo, iodo, fluoro or nitro.

It will be understood that the specific compounds named are merely exemplary of compounds within the general formulae and that the invention extends to all other specific compounds falling within the general formulae.

Additional examples of new compounds of the invention, within the foregoing general formula, which include the "phenylalkyl" radical are the following:

3-p-chlorobenzylmercapto-5-chloro-1,2,4-thiadiazole
3-m-chlorobenzylmercapto-5-chloro-1,2,4-thiadiazole
3-o-chlorobenzylmercapto-5-chloro-1,2,4-thiadiazole
3-p-nitrobenzylmercapto-5-chloro-1,2,4-thiadiazole
3-m-nitrobenzylmercapto-5-chloro-1,2,4-thiadiazole
3-o-nitrobenzylmercapto-5-chloro-1,2,4-thiadiazole
3-p-chlorophenylethylmercapto-5-chloro-1,2,4-thiadiazole
3-p-chlorophenylpropylmercapto-5-chloro-1,2,4-thiadiazole
3-p-chlorophenylbutylmercapto-5-chloro-1,2,4-thiadiazole
3-(1-p-chlorophenylbutylmercapto)-5-chloro-1,2,4-thiadiazole
3-[2-(1-p-chlorophenylbutyl)mercapto]-5-chloro-1,2,4-thiadiazole
3-[2-(2-p-chlorophenylbutyl)mercapto]-5-chloro-1,2,4-thiadiazole
3-(o,p-dinitrobenzylmercapto)-5-chloro-1,2,4-thiadiazole
3-(o,p-dinitrophenylpropylmercapto)-5-chloro-1,2,4-thiadiazole
3-(o,p-dichlorobenzylmercapto)-5-chloro-1,2,4-thiadiazole
3-pentachlorobenzylmercapto-5-chloro-1,2,4-thiadiazole
3-(p-xylylmercapto)-5-chloro-1,2,4-thiadiazole
3-(o,p-dimethylbenzylmercapto)-5-chloro-1,2,4-thiadiazole
3-(2,4,6-trimethylbenzylmercapto)-5-chloro-1,2,4-thiadiazole
3-(p-methoxybenzylmercapto)-5-chloro-1,2,4-thiadiazole
3-(o,p-dimethoxyphenylethylmercapto)-5-chloro-1,2,4-thiadiazole
3-(3-chloro-p-xylylmercapto)-5-chloro-1,2,4-thiadiazole
3-(p-bromobenzylmercapto)-5-chloro-1,2,4-thiadiazole
3-(o,p-dibromophenylethylmercapto)-5-chloro-1,2,4-thiadiazole
3-(p-propylbenzylmercapto)-5-chloro-1,2,4-thiadiazole
3-(2-bromo-p-ethylbenzylmercapto)-5-chloro-1,2,4-thiadiazole
3-(2,4,6-trichlorophenylethylmercapto)-5-chloro-1,2,4-thiadiazole Again, it will be understood that these compounds are exemplary and that the invention extends to all other such compounds falling within the general formula, particularly, Formula Number VI. Additional examples of the compounds of the invention are provided by replacing "chloro" of the expression "-5-chloro-" in the above-named compounds with bromo, iodo, fluoro or nitro.

The new compounds of the invention may be readily prepared as indicated in the following examples:

*Example I*

In a one liter three neck flask equipped with a stirrer, dropping funnel, and thermometer were placed 76.3 gms. (0.5 mole) of S-allyl isothiuronium chloride, 300 ml. of water, 0.5 gm. of soap, and 93 gms. (0.5 mole) of perchloromethyl mercaptan. The mixture was cooled to 0° C. in an ice-salt bath and a solution including 80 gms. (2 moles) of sodium hydroxide in 320 ml. of water was added dropwise over a period of 2 hours 45 minutes with the temperature held at 0° C. The mixture was stirred at 0° C. for 30 minutes. The pH was essentially neutral. The excess perchloromethyl mercaptan was decomposed with 25 ml. of 28% ammonium hydroxide and stirring was continued for 15 minutes. The reaction mixture was neutralized with 40 ml. of 1:1 HCl and, after stirring for 15 minutes, the water layer was decanted. After neutralizing any acid in the oil layer with 40 gms. of calcium carbonate, the product was steam distilled. The allyl substituted thiadiazole was extracted with 400 ml. of ether from the 3½ liters of distillate. The ether extracts were washed with saturated salt solution, filtered, and dried over magnesium sulfate. After evaporation of the ether, the residual yellow oil was fractionally distilled using an 8″ tantalum wire column. When the head temperature of the column reached about 130° C. an oily product distilled over (30.8 gms.) which was analyzed and found to be the desired product, 3-allylmercapto-5-chloro-1,2,4-thiadiazole.

*Example II*

In a two liter three neck flask with stirrer, dropping funnel, and thermometer were placed 118.5 gms. (0.5 mole) of S-(p-chlorobenzyl)-isothiuronium chloride, 500 ml. of water, 0.5 gms. of soap, and 93 gms. (0.5 mole) of perchloromethyl mercaptan plus 20 ml. of ether to aid the miscibility. The mixture was cooled to 0° C. in an ice-salt bath and a solution including 80 gms. (2 moles) of sodium hydroxide in 320 ml. of water was added dropwise over a three-hour period with the temperature kept at 0° C. The pH of the solution reached 10+ by the end of the reaction. (A stirring period of 30 minutes after the sodium hydroxide had all been added did not diminish the basicity any.) The solution was acidified using 100 ml. of 1:1 HCl. The acid mixture was stirred for 30 minutes and then the excess perchloromethyl mercaptan was decomposed with 100 ml. of 14% ammonium hydroxide after the water layer had been decanted from the oily product. The oil was taken up in 600 ml. of ether and filtered to remove 26.3 gms. of solid material, M.P. 105–110° C., which was not soluble in the ether or in the water. The ether extracts were washed with saturated salt solution, filtered, and dried over magnesium sulfate. The ether was removed on a steam bath and gave 81.3 gms. of a red thick oil. The red oil was flash distilled at 120–133° C./0.05–0.55 mm. from 80 ml. of glycerine yielding 130 ml. of distillate containing a mixture of glycerine and the thiadiazole product. The distillate was diluted with 200 ml. of water and extracted with 250 ml. of ether. The ether extracts were washed with saturated salt solution, filtered and dried over magnesium sulfate. The ether solution was concentrated to 40 ml. and poured into 50 ml. of hot hexane. After the remaining ether was removed, the product came out as a waxy solid when cooled in Dry Ice, but melted at room temperature to form a yellow oil. The yellow oil was vacuum distilled using an oil pump from a 50 ml. round bottom flask using a head with a 1:1 reflux ratio. The material remaining in the flask boiling at 128° C./1 mm. was found to be the desired 3-(p-chlorobenzylmercapto)-5-chloro-1,2,4-thiadiazole.

*Example III*

3-p-nitrobenzylmercapto-5-chloro-1,2,4-thiadiazole may be prepared as follows: To prepare the intermediate p-nitrobenzyl isothiuronium bromide, a mixture of 54 gms. (0.25 mole) of p-nitrobenzyl bromide, 19 gms. (0.25 mole) of thiourea, and 50 ml. of absolute ethanol was heated at the reflux temperature of ethanol for five minutes in a one liter three neck flask having mechanical stirring and reflux condenser. The solids go into solution just as refluxing begins and then about five minutes later the product precipitates out giving a solid reaction mixture. The alcohol was removed from the salt using a water aspirator. The dry isothiuronium salt was slurried in 250 ml. of water and 100 ml. of ether. To this mixture was added 0.2 gm. of soap and 46.5 gms. (0.25 mole) of perchloromethyl mercaptan. With stirring this mixture was cooled to 5° C. in an ice-salt bath and 40 gms. (1 mole) of sodium hydroxide in 160 ml. of water was added dropwise over a period of two hours and fifteen minutes (temperature 0–5° C.). The solution was just slightly basic (pH approximately 8). After stirring for an additional one-half hour, the reaction mixture was acidified with 5 ml. of 1:1 HCl solution and stirred for fifteen minutes to dissolve some of the impurities into the water layer. After adding 100 ml. of ether, the layers were separated and the ether layer was washed with 100 ml. of 14% ammonium hydroxide, washed with saturated salt solution, filtered, and dried over magnesium sulfate. The dried ether solution was gassed with anhydrous HCl to precipitate any remaining impurities. The mixture was filtered through celite to remove the contaminant, a yellow oil. After evaporation of the ether, a yellow solid remained which was recrystallized from cyclohexane to give 12 gms. (16.7%) of pale yellow needle-like crystals of 3-p-nitrobenzylmercapto-5-chloro-1,2,4-thiadiazole, M.P. 84–88° C. A one gm. portion was recrystallized first from cyclohexane and then from 95% ethanol to give white needles which were analyzed and found to be the desired thiadiazole, M.P. 96.5–97.5° C. Since the product's melting point was so close to that of p-nitrobenzylbromide (M.P. 98–99° C.), a mixed melting point was taken, 73–96° C. indicating the product was not starting material.

As has been indicated earlier herein, the new compounds as described above have use as biological agents. It is found that when compounded in appropriate concentrations and effectively applied, they are effective as insecticides, herbicides, fungicides, bactericides, nematocides. It may be mentioned, however, that their principal application from the standpoint of effectiveness at desired concentrations is as insecticides and herbicides.

Herbicidal compositions containing the new compounds herein (hereinafter sometimes referred to for convenience as thiadiazoles) may be prepared according to any well-known method for convenience of application. One suitable method is to prepare them as an oil-water emulsion including an organic solution of the particular compound, water and an emulsifying agent. Emulsifying agents which may be employed are any of those customarily used in the art for the preparation of oil-water emulsions. The term "oil" as used herein is intended to designate any organic liquid which is insoluble in water. Depending upon the concentration and the particular compound selected for use in the emulsion, the emulsion may be used to prevent the growth of any plants in media which normally support plant growth or they may be used to prevent the growth of certain plants while permitting normal growth of others. When employed to prevent plant growth, for example, in parking areas, along highway and railway right of ways, and the like, the emulsions may be applied by spraying only the surface of the plant growing media or they may be mixed with the media itself. Generally, spraying only the surface is sufficient to prevent plant growth in areas which are to be kept clear of plants. However, the emulsions may be incorporated into the media itself. Again, depending upon the particular compound and the concentration thereof in the herbicidal composition, the new compositions may be employed as contact herbicides or as pre-emergent herbicides.

The invention is further illustrated in its application to plants by the examples which follow hereinafter. In these examples, similar procedures are followed and in general, the test procedure employed whereby to evaluate the effectiveness of the materials includes the preparation of a sterile and weed-free soil which, thereafter is fertilized, fumigated, and treated with insecticidal agents in order to establish a growth media which will not introduce inaccuracies into the conclusions that are drawn and to assure rich nutritious media. For this purpose. a good grade of top soil which has been screened through a one-half inch wire mesh is employed. Aluminum pans 13" x 9" x 2" deep are filled with the top soil and the soil is compacted to a depth of three-eighths inch from the top of the pan. Seeds of various plants are then sowed in the pans such as wild oats, cheat grass, buckwheat, fox tail, barnyard grass, crab grass, field bind weed, pigweed, rye grass, morning glory, mustard, sugar beet, and cotton.

*Example IV*

This example shows testing of 3-allymercapto-5-chloro-1,2,4-thiadiazole as a contact herbicide. For this test, flats containing 21-day old plants were employed. A good grade of top soil which was treated with methyl bromide soil fumigant to rid it of unwanted micro-organisms and undesirable weed seeds and then with a 0.05% Krilium solution. The soil was screened through a one-half inch wire mesh. An aluminum pan 13" x 9" x 2" was leveled filled with the desired soil mixture and the soil was then compacted to a depth of three-eighths inches from the top. A variety of grass seeds were scattered randomly over two-thirds of the soil surface. Five corn seeds were placed down the center of the pan. Broadleaf seeds were scattered in the remaining one-third area. An individual bean plant (Black Valentine variety) with one mature trifoliant and one partially opened trifoliant was planted separately for determination of defoliating properties of the test compound. The planted pan was then placed in an exhaust hood and sprayed first with 30 cc. of an aqueous fertilizer solution and 0.1% octamethyl pyrophosphoramide.

After 21 days the growing plants were uniformly sprayed with 15 cc. of an organic solvent solution of the test chemical having a concentration of 0.5% by weight. The bean plant was sprayed with 5 cc. of this same test solution. After 14 days the plantings were observed and the injuries noted. The injury to the grasses and broadleaf plants was slight, whereas the injury to corn was severe. The bean plant was damaged moderately.

*Example V*

Test procedures entirely identical to those of Example IV were employed in testing the contact herbicidal properties of 3-p-chlorobenzylmercapto-5-chloro-1,2,4-thiadiazole except that the plantings included rye grass, wild oats, and crab grass in addition to the plantings of the previous example. The resulting injury to the plants was noted as follows:

| | |
|---|---|
| Grass | Severe. |
| Bean | Dead. |
| Broadleaf | Dead. |
| Corn | Dead. |
| Rye grass | Slight. |
| Wild oats | Severe. |
| Crab grass | Severe. |

Subsequent testing of the same chemical at a concentration of 0.2% by weight, which testing included cotton seedlings, revealed herbicidal action correspondingly decreased. At this concentration the observed injury was as follows:

| | |
|---|---|
| Grass | Moderate. |
| Bean | Severe. |
| Broadleaf | Severe. |
| Corn | Dead. |
| Cotton | Dead. |

The effectiveness of the compounds of the invention as pre-emergent herbicides was tested also as indicated by the following exemplary material:

*Example VI*

Planting procedures similar to those followed in Example IV were employed in testing 3-p-chlorobenzylmercapto-5-chloro-1,2,4-thiadizole as a pre-emergent herbicide. An organic solvent solution of the test chemical equivalent to 25 pounds per acre was applied uniformally to the seeded flat. After ten days, the results of the test were observed and noted as follows:

| | |
|---|---|
| Morning glory | Slight. |
| Wild oats | Slight. |
| Rye grass | Severe. |
| Radish-mustard | Slight. |
| Sugar beet | Moderate. |

| | |
|---|---|
| Barnyard grass | Moderate. |
| Crab grass | Severe. |
| Pigweed | Severe. |
| Wild buckwheat | Slight. |
| Tomato | No phytotoxicity. |
| Sorghum | No phytotoxicity. |

The compound of this example was subjected to a further test at five pounds per acre with the result that no phytotoxic effect was observed except in the case of sugar beets and pigweed. In these two instances, the damage was slight and moderate respectively.

*Example VII*

Planting procedures similar to those followed in Example IV were employed in testing 3-allylmercapto-5-chloro-1,2,4-thiadiazole as a pre-emergent herbicide. An organic solvent solution of the test chemical equivalent to 25 pounds per acre was applied uniformly to the seeded flat. After ten days, the results of the test were observed and noted as follows:

| | |
|---|---|
| Morning glory | Slight. |
| Wild oats | No phytotoxicity. |
| Rye grass | Severe. |
| Radish-mustard | Slight. |
| Sugar beet | Moderate. |
| Barnyard grass | Moderate. |
| Crab grass | Severe. |
| Pigweed | Severe. |
| Wild buckwheat | Slight. |
| Tomato | Moderate. |
| Sorghum | No phytotoxicity. |

The following examples show insecticidal effectiveness of the new compounds herein:

*Example VIII*

This example shows testing of 3-allylmercapto-5-chloro-1,2,4-thiadiazole against yellow fever mosquito larvae. In this test, early fourth instar yellow fever mosquito larvae are placed in dilute aqueous solutions or suspensions of chemicals and observed for evidences of toxic action. Solutions of the test compound in acetone were prepared and diluted with distilled water, the concentration being adjusted to produce a 0.001% concentration of the test chemical by weight of the total aqueous suspension. Approximately 25 larvae were transferred to the tube containing the suspension of the test chemical by means of a pipette. The larvae were held in the test solution at room temperature for 24 hours, at which time mortality observations were made. The mortality of the larvae was 100%.

*Example IX*

This example shows testing of 3-p-nitrobenzylmercapto-5-chloro-1,2,4-thiadiazole against yellow fever mosquito larvae. In this test, early fourth instar yellow fever mosquito larvae are placed in dilute aqueous solutions or suspensions of chemicals and observed for evidences of toxic action. Solutions of the test compound in acetone were prepared and diluted with distilled water, the concentration being adjusted to produce a 0.001% concentration of the test chemical by weight of the total aqueous suspension. Approximately 25 larvae were transferred to the tube containing the suspension of the test chemical by means of a pipette. The larvae were held in the test solution at room temperature for 24 hours, at which time mortality observations were made. The mortality of the larvae was 100%.

*Example X*

This example shows testing of 3-p-chlorobenzylmercapto-5-chloro-1,2,4-thiadiazole against yellow fever mosquito larvae. In this test, early fourth instar yellow fever mosquito larvae are placed in dilute aqueous solutions or suspensions of chemicals and observed for evidences of toxic action. Solutions of the test compound in acetone were prepared and diluted with distilled water, the concentration being adjusted to produce a 0.00003% concentration of the test chemical by weight of the total aqueous suspension. Approximately 25 larvae were transferred to the tube containing the suspension of the test chemical by means of a pipette. The larvae were held in the test solution at room temperature for 24 hours, at which time mortality observations were made. The mortality of the larvae was 90%.

The following examples show fungicidal activity of the new compounds of the invention herein:

*Example XI*

A 1-percent stock solution of the compound 3-allylmercapto-5-chloro-1,2,4-thiadiazole in a non-toxic solvent was made up, and this solution was added to sterile, melted dextrose agar in a quantity to give one part of the said compound per 10,000 parts of agar. After thorough mixing the thus treated agar was poured into petri dishes and allowed to harden. One drop of a spore suspension of the fungus *Aspergillus niger* was employed as inoculum for each plate. The inoculated plates were incubated at a temperature of 25° C. for five days. At the end of that time, inspection of the dishes showed complete inhibition of growth of the fungus, while plates not containing the said compound, but otherwise identical and incubated similarly, showed normal uninhibited growth.

*Example XII*

Procedures identical in all respects with those of Example XI were followed in testing the effectiveness of 3-p-chlorobenzylmercapto-5-chloro-1,2,4 - thiadiazole against the fungus *Aspergillus niger*. Effectiveness of this compound was found to be 100 percent growth inhibiting.

*Example XIII*

Procedures identical in all respects with those of Example XI were followed in testing the effectiveness of 3-p-nitrobenzylmercapto-5-chloro-1,2,4-thiadiazole against the fungus *Aspergillus niger*. Effectiveness of this compound was found to be 100 percent growth inhibiting.

The following examples show additional biological effectiveness of the new compounds:

*Example XIV*

This example shows testing of 3-allylmercapto-5-chloro-1,2,4-thiadiazole against *Salmonella typhosa*. A 0.2 percent stock solution of 3-allylmercapto-5-chloro-1,2,4-thiadiazole prepared from a soap solution (10 g. Ivory Snow in 80 ml. distilled water) was diluted in nutrient agar to provide test samples containing one part of the thiadiazole per thousand parts of the agar. Petri dishes were respectively filled with the test mixture, and the plates thus prepared were then respectively inoculated with said *Salmonella typhosa* organism and incubated for 48 hours at 37° C. At the end of that time, inspection of the plates showed complete inhibition of growth of the organism, while identical agar test plates, except that the thiadiazole was not present, showed normal uninhibited bacterial growth.

*Example XV*

Test procedures identical in all respects with those of Example XIV were followed in testing the effectiveness of 3-p - chlorobenzylmercapto - 5 - chloro - 1,2,4 - thiadiazole against *Straphylococcus aureus*. Effectiveness of this compound was found to be 100 percent growth inhibiting at one part per ten thousand.

*Example XVI*

Test procedures identical in all respects with those of Example XIV were followed in testing the effectiveness of 3-p-nitrobenzylmercapto-5-chloro-1,2,4-thiadiazole against *Staphylococcus aureus*. Effectiveness of this compound was found to be 100 percent growth inhibiting at one part per ten thousand.

The compounds of the invention, particularly those employed in the tests of the previous examples are effective also as nematodical agents. Nematodical activity is effectively demonstrated by preparing a one percent solution or dispersion of the test chemical, for example, an emulsion of the test chemical in a suitable organic solvent such as acetone, in concentration of as little as 0.01% by weight of the test chemical. 2.5 mls. of a suspension of live nematodes (*Panagrellus redivivis*) for example, about 50 nematodes, are placed in each of two Stender dishes, one dish acting as a control and the other being for the test chemical. Test chemical concentration of 0.02% by weight in quantity of 2.5 mls. is added to the second dish. The nematodes are examined at regular intervals and it was found after 24 hours that all of the nematodes which were subjected to the test chemicals were dead, whereas the motility of the nematodes of the control sample was 100 percent.

While the invention herein has been described with respect to particular embodiments, those skilled in the art will appreciate that various modifications within the scope of the invention may be derived from the teachings herein. Accordingly, this invention is not to be restricted unduly and is to be understood to extend to all modifications which flow from the teachings herein.

What is claimed is:
1. A compound of the formula:

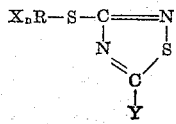

wherein Y is from the group consisting of halo and nitro radicals, R is phenylalkyl, the alkyl portion thereof having from one to four alkyl carbon atoms, wherein X is a radical from the group consisting of halo and nitro radicals, and $n$ is an integer of from one to five when X is a halogen and $n$ is from one to two where X is nitro.

2. 3-p-chlorobenzylmercapto-5-chloro-2,4-thiadiazole.
3. 3-p-nitrobenzylmercapto-5-chloro-1,2,4-thiadiazole.

References Cited in the file of this patent
UNITED STATES PATENTS

| | | |
|---|---|---|
| 2,285,410 | Bousquet et al. | June 9, 1942 |
| 2,535,876 | Stewart | Dec. 26, 1950 |
| 2,545,283 | Johnson | Mar. 13, 1951 |
| 2,613,207 | Lo et al. | Oct. 7, 1952 |
| 2,713,051 | Walter et al. | July 12, 1955 |
| 2,744,908 | Young | May 8, 1956 |
| 2,870,158 | Asinger | Jan. 20, 1959 |
| 3,090,721 | Uhlenbroek et al. | May 21, 1963 |

FOREIGN PATENTS

| | | |
|---|---|---|
| 960,281 | Germany | Mar. 21, 1957 |
| 1,069,632 | Germany | Nov. 26, 1959 |

OTHER REFERENCES

Goerdeler et al.: Chem. Ber., volume 90, pages 892–901 (1957).